United States Patent

Harris et al.

[11] Patent Number: 5,914,961
[45] Date of Patent: Jun. 22, 1999

[54] FIXED WIRELESS LOOP SYSTEM HAVING DUAL DIRECT SYNTHESIZER

[75] Inventors: Johnny M Harris, Centerville; Dan M Griffin, Bountiful, both of Utah

[73] Assignee: L-3 Communications Corporation, New York, N.Y.

[21] Appl. No.: 08/987,810

[22] Filed: Dec. 10, 1997

[51] Int. Cl.⁶ .............................. H04J 13/00; H04J 3/06
[52] U.S. Cl. .......................... 370/503; 370/342; 375/356
[58] Field of Search .................................... 370/503, 310, 370/314, 320, 321, 335, 336, 337, 338, 341, 342, 343, 344, 345, 346, 347, 350, 498, 505, 516, 517, 518, 520, 442, 441; 455/38.1, 524; 375/200, 208, 226, 354, 356, 362, 367, 371, 373, 375, 376

[56] References Cited

U.S. PATENT DOCUMENTS

| | | | |
|---|---|---|---|
| 4,227,252 | 10/1980 | Godard | 375/371 |
| 5,828,659 | 10/1998 | Teder et al. | 370/342 |
| 5,862,132 | 1/1999 | Blanchard et al. | 370/342 |

*Primary Examiner*—Dang Ton
*Attorney, Agent, or Firm*—Perman & Green, LLP

[57] ABSTRACT

Disclosed is apparatus including circuitry for providing synchronizing clocks to a transmitter and a receiver of a subscriber unit (SU) that communicates with a radio base unit (RBU) in a synchronous CDMA communication system. The apparatus includes an accumulator for generating a digital signal having a changing magnitude. The accumulator is initialized to a value of a phase command received from the RBU. The apparatus further includes a first circuit having an input coupled to an output of the accumulator for converting a content of the accumulator to a synchronized receiver clock signal, wherein the accumulator content is periodically adjusted to maintain the receiver clock signal in synchronism with a serial bit stream received from the RBU. In accordance with this invention the apparatus further includes a summer circuit having an input coupled to the output of the accumulator for combining the content of the accumulator, representing the commanded receiver side phase difference from RBU timing, with a value of a transmitter timing offset commanded by the RBU. The summer circuit provides a summation signal to a second circuit that converts the summation signal to a synchronized transmitter clock signal. In accordance with this invention problems created by the use of two independent DDSs are avoided by effectively slaving the transmit side DDS to the receive side DDS, thus insuring that the transmit side phase is accurately aligned with the SU phase commanded by the RBU.

5 Claims, 5 Drawing Sheets

FIXED WIRELESS LOOP SYSTEM HAVING DUAL DIRECT SYNTHESIZER

FIELD OF THE INVENTION

This invention relates generally to wireless local loop systems and, in particular, a fixed wireless loop system providing voice and data communications between a radio base unit and a plurality of subscriber stations.

BACKGROUND OF THE INVENTION

Local loop by traditional definition is that portion of a network that connects a subscriber's home to a central office switch. This is, however, an expansive definition that does not hold true as the network extends into the local loop by means of Digital Loop Carrier and Digital Cross Connects. For the purposes of this invention, local loop is considered as the connection from the subscriber's premises to the connecting point in the network, whatever the nature of that connection may be.

Until recently the local loop was mostly based on copper plant supplemented by microwave radio links for remote areas or difficult terrain. Over the last decade fiber optics have made significant inroads into the local loop (also referred to as "access" network) reaching closer to subscriber homes and buildings. Sonet based access networks bring fiber to the curb. These fiber based solutions can provide very high bandwidth services, reliably and cost-effectively, in urban/metropolitan areas with significant number of business customers. In fact, most access providers in the U.S. have used such fiber based plant to provide access services to U.S. business customers.

The copper and fiber based solutions, while economical in many situations, still suffer from a number of drawbacks.

For example, in an area without an existing network infrastructure, it is very time consuming and expensive to build a new network. The expense is primarily in the labor, rights acquisition (for right of way or easement), and in electronics (for fiber based access). Overall the process is very slow due to extensive effort involved in acquiring right of way and in performing the required construction, aerial and/or underground. Also, in locations with extensive but congested existing infrastructure, it is often very expensive to add capacity due to already full ducts and cables, and sometimes impossible to add capacity without resorting to upgrading the entire system. In addition, wireline solutions tend to have costs that are distance sensitive, hence they are inherently unsuitable for sparse/scattered demand. Wireline networks are also not amenable to redeployment, which results in stranded assets when demand (consumer) moves. Wireline networks also cannot be rapidly deployed in emergency situations.

The term "fixed wireless loop", or FWL, connotes a fixed wireless based local access. However, it is often mixed with limited mobility solutions under the broader term "Radio Access". Irrespective of the type of radio technology, all fixed wireless or radio access systems use wireless means to provide network access to the subscriber. Broadly speaking, there are three main categories of fixed wireless solutions.

Fixed cellular systems are primarily based on existing analog cellular systems like AMPS (in North America) or NMT (in Nordic countries).

Fixed cordless systems are primarily based on the European DECT standard using digital TDMA Time Division Duplex technology.

Bespoke systems are designed specifically for fixed wireless application. Conventional systems in this category are the analog microwave point to multi-point systems. More recently deployed systems operate at higher frequencies and employ digital technologies. These systems may be derived from similar cellular technologies, but are not based on any existing agreed standards.

Of the three main categories of fixed wireless systems there is no one solution that is clearly superior to others. If the primary need for a system operator is to provide voice oriented service wherein voice quality is not a limiting factor, then often a fixed cellular system is adequate, and even desirable because of its relatively low equipment cost. For very high density urban situations, a DECT solution may be desirable due to its high load carrying capacity and its pico-cellular architecture. Microwave solutions are best for sparse populations. Bespoke systems function well over a wide range of situations and have the best overall quality and desirable features, however they are likely to be more expensive, at least in the near future.

Most residential consumers in developing economies are mainly interested in adequate voice service. However, most business customers require data and fax service in addition to voice. With the growing popularity of home computers and Internet access, a need is arising to provide residential consumers with high speed data services at home. As such, the general trend is in the direction that all customers, both residential and business, will demand high quality voice and data services.

A problem that arises in conventional synchronous Code Division Multiple Access (CDMA) approaches relates to providing an accurate phase or timing reference in multi-point channels. It is known to provide two independent direct digital synthesizers (DDSs), one for the transmit direction and one for the receive direction. In that the two channels need to be accurately aligned, it can be appreciated that the use of independent DDSs introduces synchronization, initial start-up, and alignment problems, and requires the use of additional circuitry and software to generate a second clock with an absolute phase or timing offset to a first clock.

OBJECTS AND ADVANTAGES OF THE INVENTION

It is a thus a first object and advantage of this invention to provide an improved fixed wireless loop system that fulfills the foregoing and other needs and requirements.

It is a further object and advantage of this invention to provide an improved fixed wireless loop system that employs a dual DDS approach, wherein a second (transmit side) DDS is slaved to a first (receive side) DDS, thereby ensuring the generation of accurate transmit clocks relative to the phase of generated receive clocks.

SUMMARY OF THE INVENTION

The foregoing and other problems are overcome and the foregoing objects and advantages are realized by methods and apparatus in accordance with embodiments of this invention.

Disclosed herein is apparatus including circuitry for providing synchronizing clocks to a transmitter and a receiver of a subscriber unit (SU) that communicates with a radio base unit (RBU) in a synchronous CDMA communication system. The apparatus includes an accumulator for generating a digital signal having a changing magnitude. The accumulator is initialized to a value of a phase command received from the RBU. The apparatus further includes a first circuit having an input coupled to an output of the accumulator for converting a content of the accumulator to a synchronized receiver clock signal, wherein the accumulator content is periodically adjusted to maintain the receiver clock signal in synchronism with a serial bit stream received from the RBU.

In accordance with this invention the apparatus further includes a summer circuit having an input coupled to the output of the accumulator for combining the content of the accumulator, representing the commanded receiver side phase difference from RBU timing, with a value of a transmitter timing offset commanded by the RBU. The summer circuit provides a summation signal to a second circuit that converts the summation signal to a synchronized transmitter clock signal.

In accordance with this invention the problems created by the use of two independent DDSs are avoided by effectively slaving the transmit side DDS to the receive side DDS, thus insuring that the transmit side phase is accurately aligned with the SU phase commanded by the RBU.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
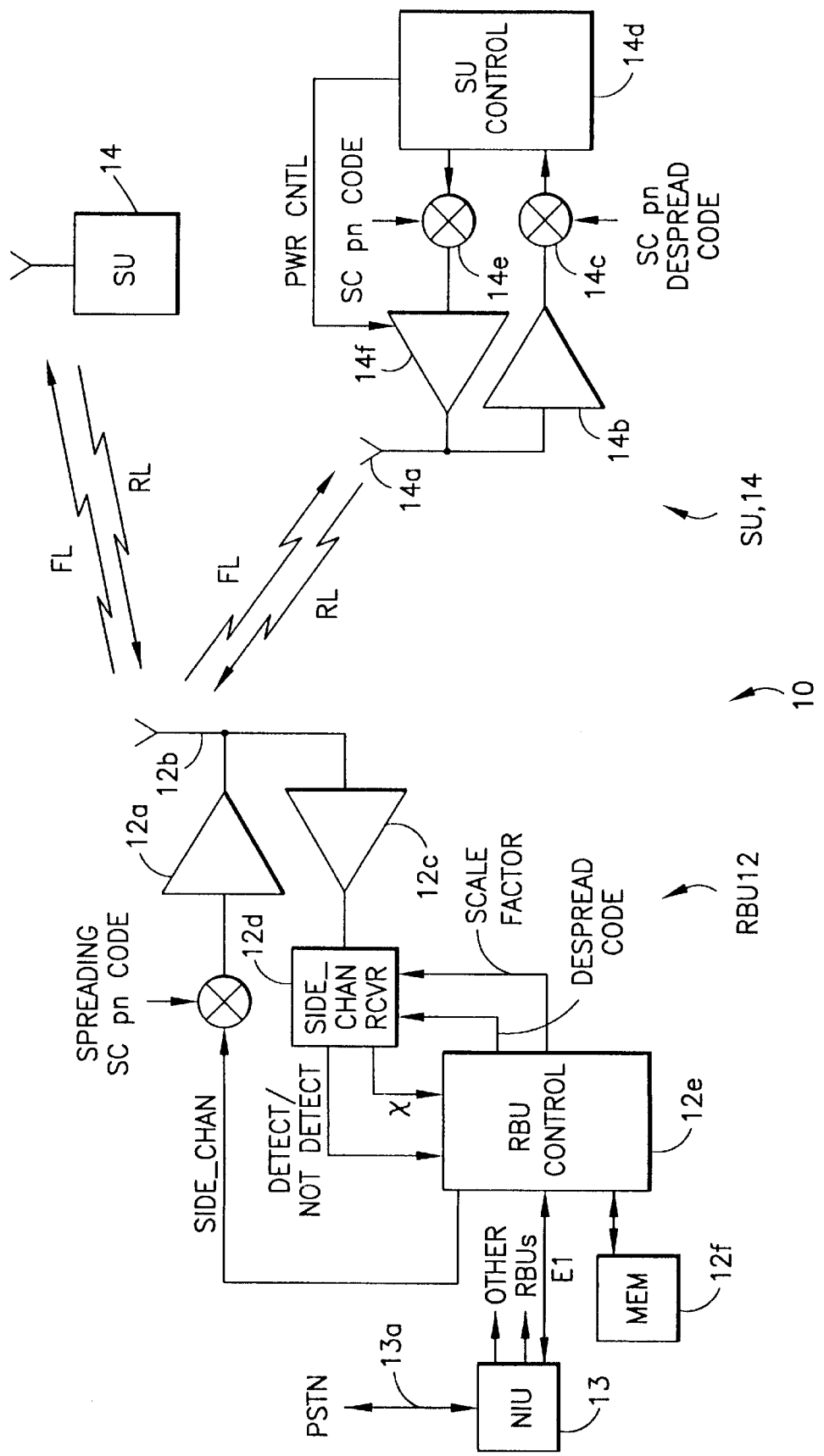
FIG. 1 is a simplified block diagram of a synchronous, DS-CDMA fixed wireless communications system in accordance with this invention, the system having a radio base unit (RBU) and a plurality of transceiver or subscriber units (SUs). The RBU transmits a side channel to the SUs, and also receives an essentially asynchronously transmitted side channel from the SUs.

By way of introduction, and referring to FIG. 1, a Fixed Wireless System (FWS) 10 in accordance with a preferred embodiment of this invention is a bespoke system based on digital radio technology. Specifically, the FWS 10 employs direct sequence spread spectrum based CDMA techniques over an air link to provide local access to subscribers. It offers very high quality, highly reliable service at costs that are very competitive with wireline solutions. The FWS 10 exhibits high spectral efficiency and thus can provide good wireline quality service with limited available bandwidth. A large dynamic range allows the FWS 10 to be deployable in a pico, micro, or mini cellular architecture meeting specific needs of dense metropolitan, urban, and suburban communities in an economical way.

Some important attributes of the FWS 10 include: wireline voice quality delivered at 32 Kbps; high throughput for data and fax applications with 32/64 Kbps throughput; high service reliability with good tolerance for noise and ingress; secure airlink; and support of enhanced services such as priority/emergency calling, both inbound and outbound.

The FWS 10 has a three to five times capacity advantage over conventional asynchronous CDMA technologies, and a three to seven times capacity advantage over currently available Time Division Multiple Access (TDMA) technology, due to its ability to use a frequency reuse of one.

The FWS 10 is a synchronous CDMA (S-CDMA) communications system wherein forward link (FL) transmissions from a radio base unit (RBU) 12 for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys voice and/or data between the RBU 12 and the SUs 14.

The SU 14 forms a portion of a Customer Premises Equipment (CPE). The CPE also includes a Network Termination Unit (NTU) and an Uninterruptible Power Supply (UPS), which are not illustrated in FIG. 1.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs 14, and also outputs a power estimate value $\chi$, as described below. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using E1 trunks and to its master antenna 12b using a coaxial cable. The. SU 14 communicates with the RBU 12 via the radio interface, as described above.

In addition, the FWS 10 has an Element Management System or EMS (not depicted) that provides Operations, Administration, Maintenance, and Provisioning (OAM&P) functions for the NIU 13 and RBU 12. The functioning of the EMS is not germane to an understanding of this invention, and will not be further described in any great detail.

The NIU 13 is the interface to the public network for the system 10. Its primary purpose is to provide the specific protocols and signaling that are required by the public network. These protocols can vary by country as well as by customer, and possibly even by the connecting point in the network.

In a preferred embodiment of this invention the NIU 13 can connect to a maximum of 15 RBUs 12 using one to four E1 connections per RBU 12, with four E1 connections being used for a fully populated RBU 12. In addition, each NIU 13 is sized for up to, by example, 10,000 subscribers. Time Slot 16 on each E1 trunk is used for passing control information between the NIU 13 and the attached RBUs 12, as well as for passing information to and from the controlling EMS. The protocol is based on the HDLC format and optimized to enhance RBU-NIU communication.

Specific functions provided by the NIU 13 include: initialization of the RBU 12; provisioning of dial tone and DTMF to the SUs 14; set up and tear down of voice and data calls; maintenance of Call Detail Record (CDR) data; HDLC Protocol (data link protocol to RBU Link Control Processor); billing system interface; Common Channel Signaling (CCS) for ringing and onhook/offhook detection; glare detection in NIU, RBU, and SU; call priority management; channel reassignment for calls in progress; detection of hook flash to enable plain old telephone service (POTS) and enhanced POTS calling features; 32/64 Kbps rate change initialization; pay phone capability (12/16 KHz tone detection, line reversal); priority and emergency number calling; accommodation of country specific signaling interfaces such as E&M, R1, R2, R2 variants, and C7; and system modularity: analog/digital options for both line side and trunk side.

The normal mode of operation for the SU 14 is a compressed speech mode using ADPCM encoding according to the ITU-T G.721 standard. This toll quality, 32 Kbps service is the default used whenever a non-X.21 channel is established with the RBU 12 (X.21 channels are configured a priori when provisioned by the EMS/NIU). The 32 Kbps channels may be used for voice band data up to 9600 b/s if desired. When the channel rate bumps to 64 Kbps PCM encoded voice/data due to detection of a fax/modem start tone, fax and modem rates of at least 33.6 Kbps are possible.

Figure 2:
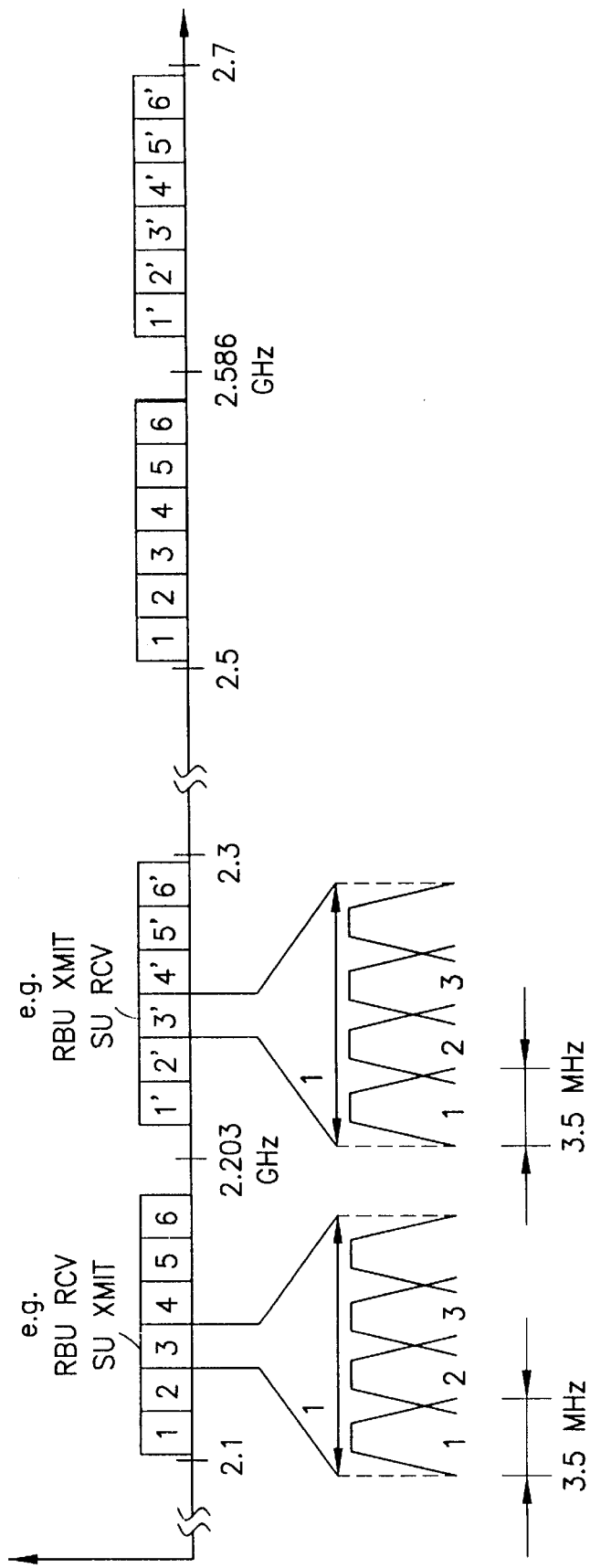
FIG. 2 is an exemplary frequency allocation diagram of the system of FIG. 1.

The SU-RBU air link provides a separate 2.72 MHz (3.5 MHz including guardbands) channel in each direction separated by either 91 MHz or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As per the ITU 283.5 specification, there are a total of 96 frequency pairs allowed, as shown in FIG. 2. By example, the RBU 12 may transmit in the 3' frequency band and receive in the 3 frequency band, and the SU 14 transmits in the 3 frequency band and receives in the 3' frequency band.

The RBU 12 can support 128 simultaneous 34 Kbps channels using the 2.72 MHz bandwidth giving it a spectral efficiency of 1.6 bits/Hz. Of this total capacity, 8 channels are used by the FWS 10 and an additional 2 Kbps per channel is system overhead. Thus the effective traffic carrying capacity is 120 channels at 32 Kbps.

The spectral efficiency of the FWS 10 is three to five times that of conventional CDMA systems primarily because the FWS 10 employs bi-directional Synchronous CDMA. Competing systems, including those based on IS-95, are asynchronous or synchronous only in one direction. The bi-directional synchronicity permits the FWS 10 to use near orthogonal spreading codes and gain maximum possible data carrying capacity.

Radio emissions lose energy as they travel in air over long distances. In order to ensure that the received signal energy from a distant subscriber is not completely overwhelmed by that of a near subscriber, the RBU 12 controls the power level of the SUs 14. In the preferred embodiment only the reverse channel power (from SU 14 to the RBU 12) is controlled by the RBU 12. The power control is primarily established at SU 14 initialization.

Subsequent power adjustments are infrequent and are made in response to transient environmental conditions. The closed loop power control is implemented by comparing against a desired power level and making incremental adjustments until the desired level is achieved.

The forward channel power control is not needed since each SU 14 receives its entire signal at only one level. The RBU 12 merely needs to ensure that the received signal strength by the farthest SU 14 is sufficient for its application.

It is not always desirable to have an extended range. In a dense urban or even a suburban setting, one needs to deploy the system in a cellular architecture as depicted below. To reduce interference between sectors and between cells in such a deployment, the range of the RBU is limited overall as well as selectively in specific directions. Such range control may be accomplished using a directional master antenna 12b at the RBU 12, as well by controlling overall RBU power.

When one of the SUs 14 detects an off-hook (the user has picked up the phone), it transmits an outgoing call request on one of six reverse synchronous side channels in a Slotted ALOHA fashion. The side channel is chosen at random. The RBU 12 processes the request and, providing an active channel is available, sends an outgoing call reply to the SU 14 which contains the active channel codes (both forward and reverse). In the meantime, the RBU 12 begins to transmit forward side channel data on the newly activated channel and at a given time, begin to transmit the active call data. The SU 14, which is listening to the forward side channel, receives the active channel assignment and switches at a superframe boundary to the active codes. The SU 14 then begins to receive the side channel data and then the active call data.

When an incoming call is received by the NIU 13 for one of the SUs 14 in the local loop, the RBU 14 is notified over the E1 link. The RBU 12 first checks to determine if the intended SU 14 is busy. If not, the RBU 14 sends a message to the SU 14 on the forward side channel, the message containing the active channel codes. The call processing then continues in the same manner as the outgoing call processing discussed above.

If all channels are busy and the NIU 13 receives an incoming call for a non-busy SU 14, it provides a subscriber busy tone to the caller unless the called SU has priority inbound access (such as a hospital, fire station, or police), in which case the NIU 13 instructs the RBU 12 to drop the least priority call to free up a channel for the called SU 14. Similarly, if an SU 14 initiates a request for service and no traffic channels are open, then the RBU 12 provides the dial tone on a temporary traffic channel and receives the dialed number. If the dialed number is an emergency number the RBU 12 drops a least priority call to free up a traffic channel and connects the free channel to the SU 14. If the called number is not an emergency number then the SU 14 is provided a special busy tone indicating a "wait for service" condition.

Figure 6:
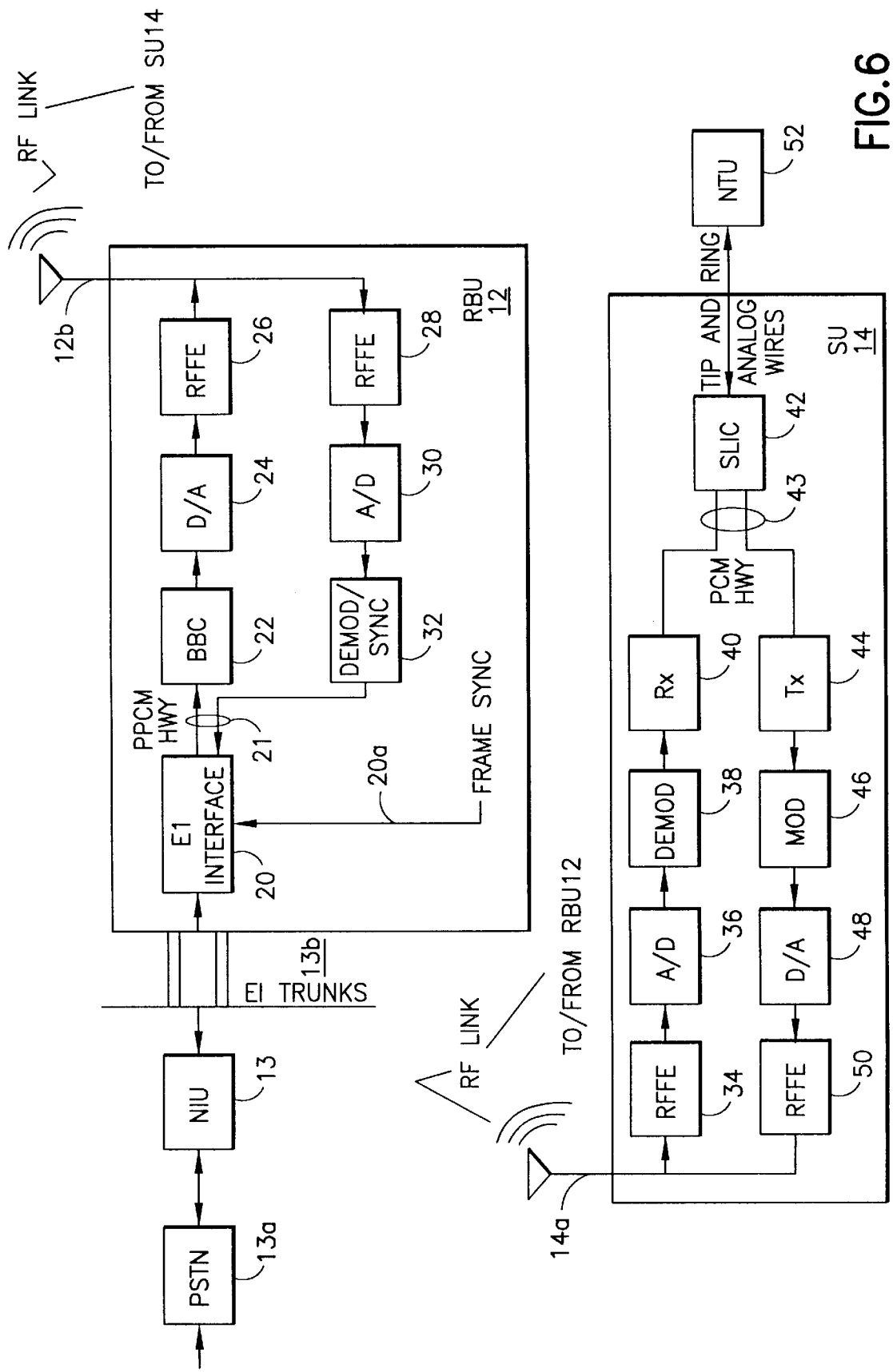
FIG. 6 is a block diagram that illustrates the RBU and SU of FIG. 1 in greater detail.

Reference is now made to FIG. 6 for illustrating the RBU 12 and SU 14 in greater detail.

An incoming call from the PSTN 13a passes through the NIU 13 to 64 Kbps per channel E1 trunks 13b and then to a RBU-resident E1 interface 20. The E1 interface 20 optionally performs an A-Law ADPCM algorithm for the compression of the 64 Kbps channel to a 32 Kbps channel that is placed on a PCM highway 21 time slot. If the A-Law ADPCM compression is bypassed, the 64 Kbps channel is split into two 32 Kbps channels and placed onto the PPCM Highway 21. In the preferred embodiment the RBU 12 can accommodate up to 128 32 Kbps channels, and each SU 14 can accommodate up to four 32 Kbps channels. The PPCM Highway 21 operates in conjunction with a frame synchronization (FrameSync) signal 20a, which represents a master timing pulse that is generated every 16 ms. All calls to and from the RBU 12 pass through the PPCM Highway 21 and the E1 interface 20. For the case of an incoming call the signal is applied to a baseband combiner (BBC) 22 and thence to a D/A converter 24 and a transmit radio frequency front-end (RFFE) 26 before being applied to the antenna 12b for transmission to the SU 14. At the SU 14 the incoming call signal is received by the antenna 14a and is applied to a receive RFFE 34, an A/D 36, demodulator 38 and a receiver 40. The SU 14 includes a subscriber line interface circuit (SLIC) 42 that couples a pulse code modulation (PCM) Highway 41 to a network termination unit (NTU) 52. In the reverse direction a call originates at the NTU 52 and passes through the SLIC 42 and PCM Highway 41 to a transmitter 44, modulator 46, D/A converter 48 and a transmit RFFE 50. The signal is applied to the SU antenna 14a and is received by the RBU antenna 12b. The received signal is applied to a receive RFFE 28, A/D converter 30, a demodulator and synchronization unit 32, and then to the PPCM Highway 21 and E1 interface 20 for connection to the PSTN 13a via one of the E1 trunks 13b and the NIU 13.

The RBU 12 controls the master timing for the entire FWS 10. Timing throughout the FWS 10 is referenced to the periodic timing pulse generated at the PPCM Highway 21, i.e., to the FrameSync signal 20a. In the FWS 10 all data is grouped into equal-sized packets referred to as frames, which in turn are grouped into super-frames with, for example, three frames making up one super-frame.

Having described the overall architecture and capabilities of the FWS 10, a detailed description of this invention will now be made, beginning with FIG. 3.

Figure 3:
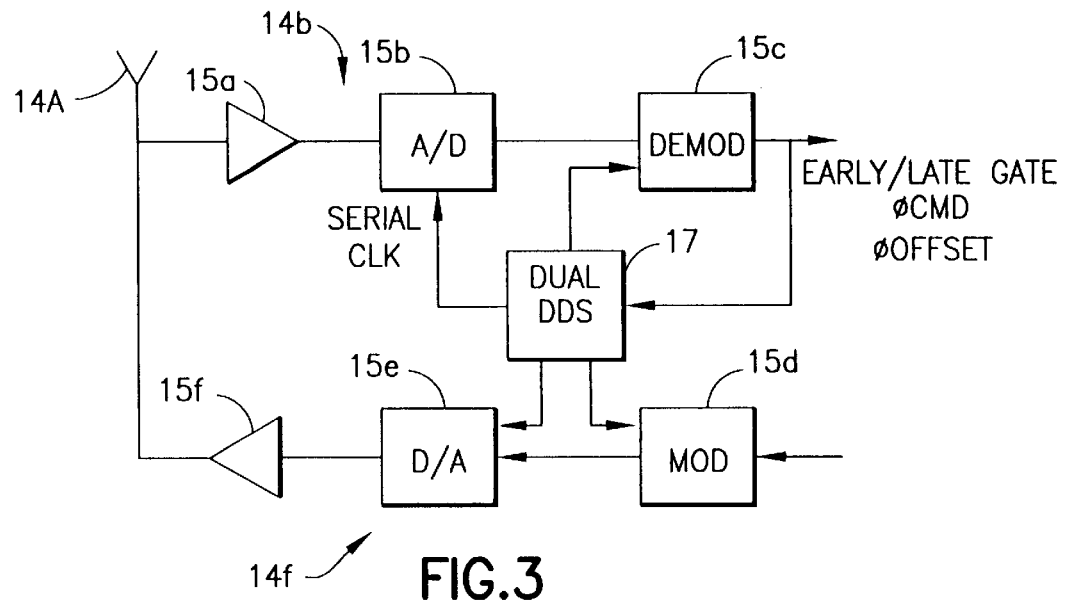
FIG. 3 is a simplified block diagram of an RF section of one SU, and shows the dual DDS connected between the receive and transmit chains.

FIG. 3 illustrates a portion of the SU 14 of FIG. 1, in particular the receiver 14b and the transmitter 14f. The receiver 14b includes a low noise receive amplifier 15a, an analog to digital (A/D) converter 15b (shown as 36 in FIG. 6) for sampling the received signal, and a demodulator (DEMOD) 15c (shown as 38 in FIG. 6) for converting the received signal to base band. The transmitter 14f includes a modulator 15d (shown as 46 in FIG. 6), digital to analog converter (D/A) 15e (shown as 48 in FIG. 6), and a transmit amplifier 15f. Coupled to the receiver and transmitter circuitry is the dual DDS 17 in accordance with this invention. The dual DDS 17 receives a phase command (ρCMD) and a phase offset command (ρOFFSET) from the demodulator 15c (via the SU controller 14d of FIG. 1), which are initially transmitted from the RBU 12. The dual DDS 17 generates a plurality of clocks that are used throughout the SU 14, including a receive sample clock provided to the A/D 15b, and various chip, symbol, and data clocks used by the DEMOD 15c, MOD 15D, and other SU 14 components.

In a true S-CDMA system, each user signal present at the input of the RBU 12 is required to be timing phase (i.e. sub-chip), half-chip, and full-chip aligned with the RBU's master timing. In the presently preferred embodiment of this invention the S-CDMA requirements are expanded to include frame and super-frame alignment. As a result, each user signal present at the input of the RBU 12 is timing phase, half-chip, full-chip, frame, and super-frame aligned with the RBU's master timing. Super-frame alignment is accomplished dynamically through asynchronous communications between the RBU 12 and each individual SU 14. The RBU 12 initiates a two-step process with each SU 14 that is brought on-line in the FWS 10. The first step is for the SU 14 to achieve super-frame alignment with the RBU's transmitted signal. The RBU-to-SU link is referred to as the "forward link". Conversely, the SU-to-RBU link is the "reverse link". The SU 14 synchronizes to the RBU's transmitted signal by searching the incoming data and locating two time-aligned 5-symbol sync codes, collectively referred to as S, which the RBU 12 loads into the beginning of each frame. Once this is accomplished, the SU 14 searches until it finds three consecutive frames containing in their respective order: $S^-$,S, S. ($S^-$ denotes the logical inverse of S). There is no $S^-$, however, on the reverse link, as it is not needed due to system parameter constraints. The SU 14 has, at this point, established its own super-frame boundary. Due to hardware and RF-path delays, the SU 14 super-frame boundary is delayed several symbol times from the RBU's super-frame boundary. With the SU's received super-frame timing established, the SU 14 begins to transmit frames to the RBU 12 across the reverse link. Initially, the SU 14 delays the transmitter superframe boundary from the receiver boundary by an amount such that the SU 14 signal is super-frame aligned at the RBU 12 for a case where the RF-path delay is zero (i.e., physical distance between the RBU 12 and SU 14 is zero meters). The second step in this two-step process is for circuitry within the RBU's receiver to search the incoming data for the sync code. Due to hardware and RF-path delays, the super-frame boundary will once again be delayed several symbols in time. Once the sync code is consistently found, the RBU 12 calculates the symbol delay, N, between the super-frame boundary of the RBU 12 and the SU 14. Using this offset, the RBU 12 commands the SU 14 to delay its transmitted signal by N symbols (the phase command). The maximum line-of-sight distance allowed in the FWS 10 between the RBU 12 and a SU 14 ultimately causes N to be constrained to, by example, $0 \leq N \leq 15$ symbols. This operation drives the two super-frame boundaries together in time at the RBU 12. At this time, super-frame alignment has been achieved with that SU 14, and communications with the SU 14 is switched from asynchronous to synchronous. The same procedure is performed by the RBU 12 for each new SU 14 that is brought on-line. Periodically (e.g., every three seconds) the RBU 12 sends a phase offset command to the SU 14 to readjust, if necessary, the transmit offset timing of the SU.

Figure 4:
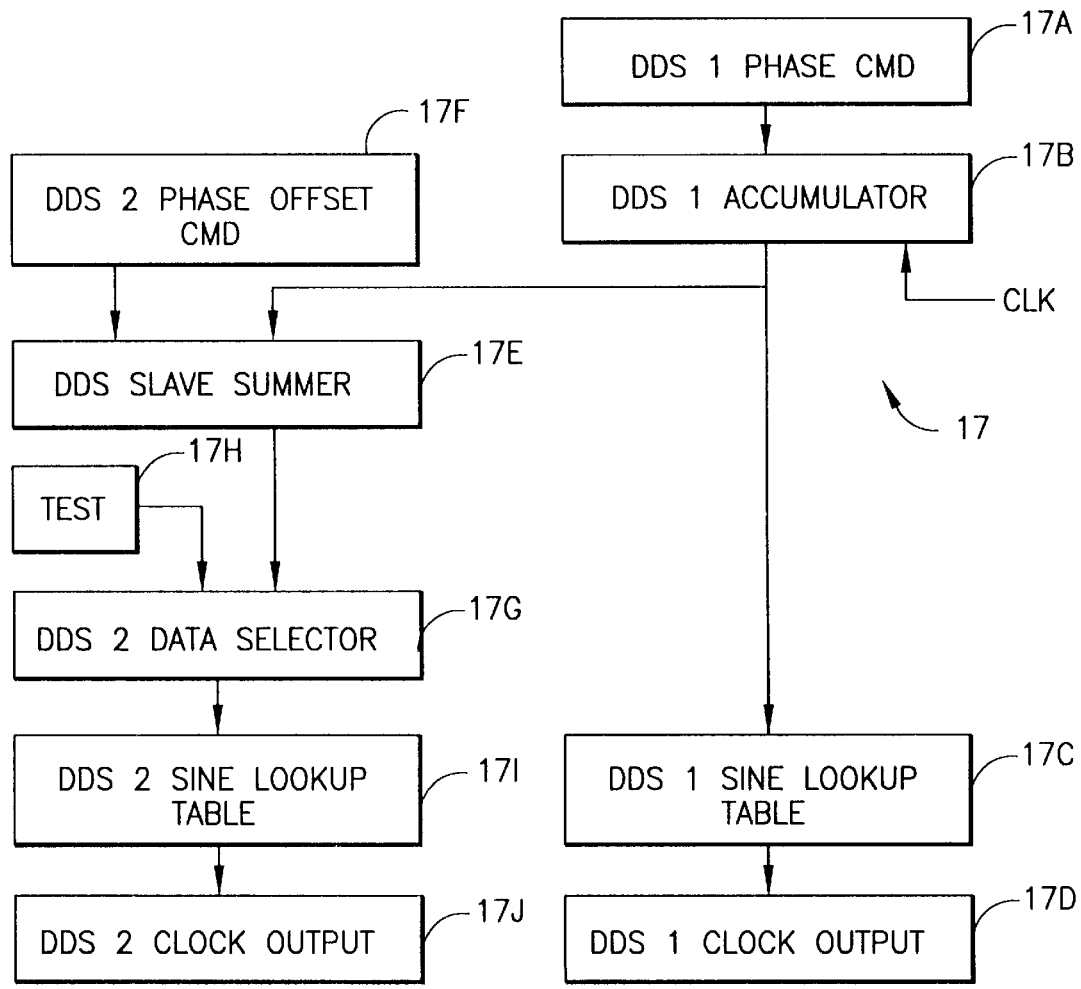
FIG. 4 is a block diagram of the dual DDS of FIG. 3.

Having described the general timing alignment procedure, reference is made to FIG. 4 for illustrating the dual DDS 17 in greater detail. An input register is referred to as a DDS 1 phase command register 17A which stores the phase command received from the RBU 12, and which provides an input to a DDS 1 accumulator 17B for initializing the accumulator to the value contained in the phase command. By example, the accumulator may be a 40 bit device. A receiver early/late gate command that is periodically received from the demodulator 15C (e.g., at a 5 MHz rate) is used to maintain the receiver serial clock in synchronization with the incoming serial bit stream. The early/late gate signal is typically generated by a correlator to indicate a degree of synchronization between the input bit stream and the sampling of same that is controlled by the serial clock in the A/D converter 15b. The DDS 1 accumulator 17B is operated by the receive clock signal to provide a constantly increasing value that provides an output to a DDS 1 sine lookup table 17C, which in turn provides an output (e.g., 8 bits) to a D/A converter that forms a portion of a DDS 1 clock output block 17D. The accumulator output is periodically adjusted by the early/late gate signal to add or delete counts, as required, to maintain the receiver clock in synchronization with the input bit stream.

Figure 5A:
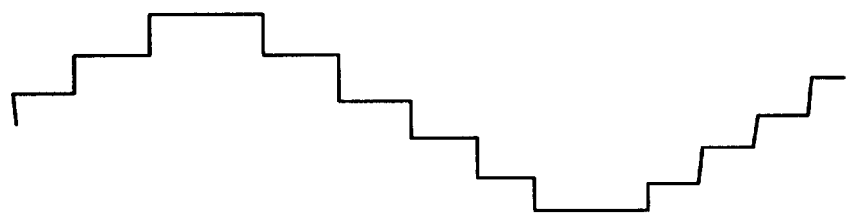
FIGS. 5A–5C illustrate exemplary waveforms generated by the dual DDS.
Figure 5B:
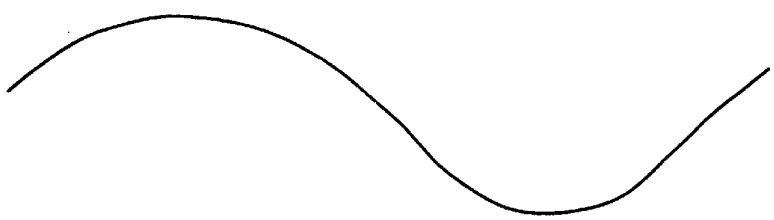
Figure 5C:
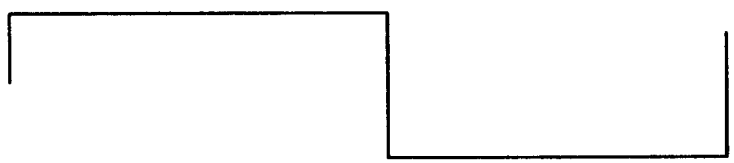

Referring briefly to FIGS. 5A–5C, and assuming for this case a four level sine approximation output by the D/A converter (FIG. 5A), the signal is filtered in the DDS 1 clock output block 17D to provide a nominal sine wave (FIG. 5B), and is then squared (FIG. 5C) to provide the serial clock signal to the A/D converter 15B. A divider chain (not shown) divides down the serial clock signal to provide the necessary lower frequency chip, symbol and data clocks for operating the SU 14. The sine look-up table 17C may store only one quadrant of information, and other circuitry may manipulate the output to provide the values for the remaining three quadrants.

The phase command signal essentially sets the starting point for the sine wave generation, and thus sets a phase delay or difference between the SU 14 receiver timing and the RBU 12 master system timing.

In accordance with this invention the output of the DDS 1 accumulator 17B is provided to a DDS slave summer 17E which also receives an input from a DDS 2 phase offset command register 17F. During power-up initialization of the SU 14 the DDS 2 phase offset command register 17F can be loaded with a previous phase offset command so as to provide a coarse initial synchronization. The summer 17E effectively adds the current value of a phase offset command signal that is received from the RBU 12 to the current value of the accumulator 17B to provide the required transmit side timing synchronization with the RBU 12. The output of the summer 17E is applied to a DDS 2 data selector 17G, effectively a 2:1 multiplexer, enabling a Test input 17H to be applied instead to a DDS 2 sine lookup table 17I and DDS 2 clock output unit 17J.

The use of the DDS slave summer 17E eliminates the conventional reliance on the use of two independent DDSs, and the problems associated with aligning and synchronizing the two DDSs one to another. In effect, the second DDS (DDS 2) is slaved to the first DDS (DDS 1), and automatically tracks the receive side phase difference commanded by the RBU 12, as well as early/late gate adjustments to this value in order to maintain receiver synchronization. Furthermore, any disturbances are quickly accommodated, as the receive side is locked to the receive clock, while the delayed transmit clock is offset by an exact amount from the receiver side timing.

Although described in the context of a synchronous CDMA system, those skilled in the art will realize that the teachings of this invention could be applied as well to TDMA systems for correctly synchronizing and aligning receive time slots and transmit bursts with system timing.

Thus, while the invention has been particularly shown and described with respect to preferred embodiments thereof, it will be understood by those skilled in the art that changes in form and details may be made therein without departing from the scope and spirit of the invention.

What is claimed is:

1. Apparatus for providing synchronizing clocks to a transmitter and receiver of a remote unit that communicates with a master unit, comprising:

an accumulator for generating a digital signal having a changing magnitude, said accumulator being initialized to a value of a phase difference between master unit timing and remote unit timing;

a first circuit having an input coupled to an output of said accumulator for converting a content of said accumulator to a synchronized receiver clock signal;

a summer circuit having an input coupled to said output of said accumulator for combining said content of said accumulator with a value of a commanded timing offset from said phase difference to provide a summation signal; and a second circuit having an input coupled to an output of said summer circuit for converting said summation signal to a synchronized transmitter clock signal.

2. Apparatus as in claim 1, wherein said first circuit is comprised of a sine look-up table providing an approximation of a sine wave having a phase defined by a phase command received from said master unit, and circuitry for converting said approximation of a sine wave to a digital clock signal.

3. Apparatus for providing synchronizing clocks to a transmitter and receiver of a subscriber unit (SU) that communicates with a radio base unit (RBU) in a synchronous CDMA communication system, comprising:

an accumulator for generating a digital signal having a changing magnitude, said accumulator being initialized to a value of a phase command received from said RBU;

a first circuit having an input coupled to an output of said accumulator for converting a content of said accumulator to a synchronized receiver clock signal, said accumulator content being periodically adjusted to maintain said receiver clock signal in synchronism with a serial bit stream received from said RBU;

a summer circuit having an input coupled to said output of said accumulator for combining said content of said accumulator with a value of a transmitter timing offset commanded by said RBU to provide a summation signal; and a second circuit having an input coupled to an output of said summer circuit for converting said summation signal to a synchronized transmitter clock signal.

4. Apparatus as in claim 3, wherein said first circuit is comprised of a sine look-up table providing an approximation of a sine wave having a phase defined by said phase command received from said RBU, and circuitry for converting said approximation of a sine wave to said receiver clock signal.

5. A method for generating synchronizing clocks to a transmitter and receiver of a subscriber unit (SU) that communicates with a radio base unit (RBU) in a synchronous CDMA communication system, comprising steps of:

operating a receive side digital frequency synthesizer to generate digital values representative of a receive clock signal having a phase that is specified by a command received from the RBU;

periodically adjusting the generated digital values to maintain receiver synchronization with a serial bit stream received from the RBU;

converting the generated digital values to receive clock pulses;

slaving a transmit side digital frequency synthesizer to the digital values generated by the receive side digital frequency synthesizer and adding a phase offset value to the digital values to produce a summation signal, the phase offset value being received from the RBU; and converting the summation signal to transmit clock pulses.

* * * * *